United States Patent
Liao et al.

(10) Patent No.: US 11,514,261 B2
(45) Date of Patent: Nov. 29, 2022

(54) IMAGE COLORIZATION BASED ON REFERENCE INFORMATION

(71) Applicant: Microsoft Technology Licensing, LLC, Redmond, WA (US)

(72) Inventors: Jing Liao, Redmond, WA (US); Lu Yuan, Beijing (CN); Dongdong Chen, Redmond, WA (US); Mingming He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 163 days.

(21) Appl. No.: 17/056,737

(22) PCT Filed: Jun. 19, 2019

(86) PCT No.: PCT/US2019/037835
§ 371 (c)(1),
(2) Date: Nov. 18, 2020

(87) PCT Pub. No.: WO2020/005650
PCT Pub. Date: Jan. 2, 2020

(65) Prior Publication Data
US 2021/0201071 A1    Jul. 1, 2021

(30) Foreign Application Priority Data
Jun. 26, 2018   (CN) .......................... 201810706012.4

(51) Int. Cl.
*G06K 9/00*       (2022.01)
*G06K 9/62*       (2022.01)
(Continued)

(52) U.S. Cl.
CPC ............. *G06K 9/6215* (2013.01); *G06N 3/08* (2013.01); *G06T 7/90* (2017.01); *G06V 10/40* (2022.01);
(Continued)

(58) Field of Classification Search
CPC ................... G06K 9/6215; G06T 7/90; G06T 2207/20081; G06T 2207/20084; G06T 2207/20224; G06V 10/40; G06N 3/08
(Continued)

(56) References Cited

PUBLICATIONS

Sipan, Muhammad, N. Supeno Mardi Susiki, and Eko Mulyanto Yuniarno. "Image block matching based on glcm (gray level co-occurence matrix) texture feature on grayscale image auto coloring." 2017 International Seminar on Intelligent Technology and Its Applications (ISITIA). IEEE, 2017. (Year: 2017).*

(Continued)

*Primary Examiner* — Jonathan S Lee
(74) *Attorney, Agent, or Firm* — Schwegman Lundberg & Woesner, P.A.

(57) ABSTRACT

According to implementations of the subject matter described herein, there is provided an image colorization solution. The solution includes determining a similarity between contents presented in a grayscale source image and a color reference image and determining a col or target image corresponding to the source image based on the similarity. Specifically, a first and a second sets of blocks similar and dissimilar to the reference image are determined based on the similarity; a first color for the first set of blocks is determined based on a color of corresponding blocks in the reference image; a second color for the second set of blocks is determined independently of the reference image. Through this solution, it is possible to provide user controllability and customized effects in colorization, and there is no strict requirement on correspondence between the color image and grayscale image, achieving more robustness to selection of color reference images.

15 Claims, 5 Drawing Sheets

(51) Int. Cl.
- *G06T 7/90* (2017.01)
- *G06N 3/08* (2006.01)
- *G06V 10/40* (2022.01)

(52) U.S. Cl.
CPC .............. *G06T 2207/20081* (2013.01); *G06T 2207/20084* (2013.01); *G06T 2207/20224* (2013.01)

(58) Field of Classification Search
USPC ........................................................ 382/100
See application file for complete search history.

(56) References Cited

PUBLICATIONS

Nie, Dongdong, et al. "Optimization based grayscale image colorization." Pattern recognition letters 28.12 (2007): 1445-1451. (Year: 2007).*
Liu, Shiguang, and Xiang Zhang. "Automatic grayscale image colorization using histogram regression." Pattern Recognition Letters 33.13 (2012): 1673-1681. (Year: 2012).*
Babenko, et al., "Aggregating local deep features for image retrieval", In Proceedings of the IEEE international conference on computer vision, 2015, pp. 1269-1277.
Babenko, et al., "Neural codes for image retrieval", In Proceedings of 13th European conference on computer vision, Sep. 6, 2014, 16 Pages.
Badrinarayanan, et al., "SegNet: A Deep Convolutional Encoder-Decoder Architecture for Image Segmentation", Retrieved from https://arxiv.org/pdf/1511.00561.pdf, Oct. 10, 2016, 14 Pages.
Bonneel, et al., "Blind video temporal consistency", In Journal of ACM Transactions on Graphics (TOG), vol. 34, No. 6, Oct. 26, 2015, pp. 1-9.
Bugeau, Aurelie, "Patch-based image colorization", In Proceedings of the 21st International Conference on Pattern Recognition (ICPR), Dec. 23, 2012, 4 Pages.
Bugeau, et al., "Variational exemplar-based image colorization", In Journal of IEEE Transactions on Image Processing, vol. 23, No. 1, 2014, 9 Pages.
Charpiat, et al., "Automatic image colorization via multimodal predictions", In European conference on computer vision, Springer, Berlin, Heidelberg, Oct. 12, 2008, pp. 126-139.
Chen, et al., "Photographic image synthesis with cascaded refinement networks", In Proceedings of the IEEE international conference on computer vision, 2017, pp. 1511-1520.
Chen, et al., "StyleBank: An Explicit Representation for Neural Image Style Transfer", In Proceedings of IEEE Conference on Computer Vision and Pattern Recognition, Jul. 21, 2017, pp. 2770-2779.
Cheng, et al., "Deep colorization", In Proceedings of the IEEE International Conference on Computer Vision, 2015, pp. 415-423.
Chia, et al., "Semantic colorization with internet images", In Journal of ACM Transactions on Graphics (TOG), vol. 30, No. 6, Dec. 12, 2011, 8 Pages.
Deshpande, et al., "Learning large-scale automatic image colorization", In Proceedings of the IEEE International Conference on Computer Vision, 2015, pp. 567-575.
Gong, et al., "Multi-scale orderless pooling of deep convolutional activation features", In Proceedings of 13th European Conference on Computer Vision, Sep. 6, 2014, 17 Pages.
He, et al., "Deep Residual Learning for Image Recognition", In Journal of Computing Research Repository, Dec. 10, 2015, pp. 1-12.
Huang, et al., "An adaptive edge detection based colorization algorithm and its applications", In Proceedings of the 13th annual ACM international conference on Multimedia, Nov. 6, 2005, pp. 351-354.
Iizuka, et al., "Let there be color! Joint end-to-end learning of global and local image priors for automatic image colorization with simultaneous classification", In Journal of ACM Transactions on Graphics (ToG), vol. 35, No. 4, Jul. 11, 2016, pp. 1-11.
Ioffe, et al., "Batch Normalization: Accelerating Deep Network Training by Reducing Internal Covariate Shift", In Proceedings of the 32nd International Conference on Machine Learning, vol. 37, Jul. 6, 2015, 9 pages.
Irony, et al., "Colorization by Example", Retrieved From: http://citeseerx.ist.psu.edu/viewdoc/download?doi=10.1.1.76.424&rep=rep1&type=pdf, Jun. 29, 2005, 10 Pages.
Isola, et al., "Image-to-image translation with conditional adversarial networks", In Proceedings of the IEEE conference on computer vision and pattern recognition, Jul. 21, 2017, pp. 1125-1134.
Johnson, et al., "Perceptual losses for real-time style transfer and super-resolution", In European conference on computer vision, Oct. 8, 2016, pp. 1-18.
Kingma, et al., "Adam: A Method for Stochastic Optimization", In Journal of The Computing Research Repository, Dec. 22, 2014, pp. 1-9.
Krizhevsky, et al., "ImageNet Classification with Deep Convolutional Neural Networks", In Advances in neural information processing systems, Dec. 2012, pp. 1097-1105.
Larsson, et al., "Learning representations for automatic colorization", In European conference on computer vision, Springer, Cham, Oct. 8, 2016, pp. 577-593.
Levin, et al., "Colorization using optimization", In ACM SIGGRAPH Papers, Aug. 1, 2004, pp. 689-694.
Liao, et al., "Visual Attribute Transfer through Deep Image Analogy", In Journal of Computing Research Repository, May 2, 2017, 16 Pages.
Liu, et al., "Intrinsic colorization", In ACM SIGGRAPH Asia papers, Dec. 1, 2008, pp. 1-9.
Liu, et al., "SIFT Flow: Dense Correspondence across Scenes and Its Applications", In Journal of IEEE Transactions on Pattern Analysis and Machine Intelligence, vol. 33, Issue 5, May 2011, pp. 978-994.
Luan, et al., "Natural image colorization", In Proceedings of the 18th Eurographics conference on Rendering Techniques, Jun. 25, 2007, pp. 309-320.
Mingming, et al., "Deep exemplar-based colorization", In Journal of ACM Transactions on Graphics (TOG), vol. 37 Issue 4, Jul. 30, 2018, pp. 47.1-47.16.
Mingming, et al., "Neural Color Transfer between Images", In Arxiv.org, Cornell University Library, Oct. 2, 2017, 14 Pages.
"International Search Report Issued in PCT Patent Application No. PCT/US2019/037835", dated Aug. 22, 2019, 12 Pages.
Qu, et al., "Manga colorization", In Journal of ACM Transactions on Graphics (TOG), vol. 25, No. 3, Jul. 1, 2006, pp. 1214-1220.
Radford, et al., "Unsupervised Representation Learning with Deep Convolutional Generative Adversarial Networks", In Journal of the Computing Research Repository, Nov. 19, 2015, 15 Pages.
Razavian, et al., "A baseline for visual instance retrieval with deep convolutional networks", In International Conference on Learning Representations, San Diego, CA, ICLR, May 7, 2015, 4 Pages.
Reinhard, et al., "Color Transfer between Images.", In Proceedings of the IEEE Computer Graphics and Applications, vol. 21, Issue 5., Sep. 2001, 8 Pages.
Sajjadi, "Enhancenet: Single image super-resolution through automated texture synthesis", In Proceedings of the IEEE International Conference on Computer Vision, Jul. 30, 2017, pp. 4491-4500.
Sangkloy, et al., "Scribbler: Controlling deep image synthesis with sketch and color", In Proceedings of the IEEE Conference on Computer Vision and Pattern Recognition, Dec. 2, 2016, pp. 5400-5409.
Szegedy, et al., "Going Deeper with Convolutions", In Proceedings of the IEEE Conference on Computer Vision and Pattern Recognition, Jun. 7, 2015, pp. 1-9.
Tai, et al., "Local color transfer via probabilistic segmentation by expectation-maximization", In IEEE Computer Society Conference on Computer Vision and Pattern Recognition (CVPR'05), vol. 1, Jun. 20, 2005, 8 Pages.
Tola, "Daisy: An efficient dense descriptor applied to wide-baseline stereo", In Journal of IEEE transactions on pattern analysis and machine intelligence, vol. 32, No. 5, May 2010, pp. 815-830.

(56) References Cited

PUBLICATIONS

Tolias, et al., "Particular object retrieval with integral max-pooling of CNN activations", In Journal of the Computing Research Repository, Feb. 24, 2016, pp. 1-12.
Weinzaepfel, et al., "Deepflow: Large Displacement Optical Flow with Deep Matching", In Proceedings of IEEE International Conference on Computer Vision, Dec. 1, 2013, pp. 1385-1392.
Welsh, et al., "Transferring color to greyscale images", In Proceedings of the 29th annual conference on Computer graphics and interactive techniques, Jul. 1, 2002, pp. 277-280.
Yatziv, et al., "Fast image and video colorization using chrominance blending", In Article of IEEE transactions on image processing, vol. 15, No. 5, Apr. 18, 2006, 16 Pages.
Yu, et al., "Multi-Scale Context Aggregation by Dilated Convolutions", Published as a conference paper at ICLR 2016, May 8, 2016, 13 Pages.
Zhang, et al., "Colorful Image Colorization", In European Conference on Computer Vision, Oct. 8, 2016, 29 Pages.
Zhang, et al., "Real-time user-guided image colorization with learned deep priors", In Journal of Computing Research Repository (CoRR), May 8, 2017, 11 Pages.
Zhou, "Learning dense correspondence via 3d-guided cycle consistency", In Proceedings of the IEEE Conference on Computer Vision and Pattern Recognition, 2016, pp. 117-126.
Gupta, et al., "Image colorization using similar images", In Proceedings of the 20th ACM international conference on Multimedia, Oct. 29, 2012, pp. 369-378.

\* cited by examiner

IMAGE COLORIZATION BASED ON REFERENCE INFORMATION

CROSS-REFERENCE TO RELATED APPLICATION

This application is a U.S. National Stage Filing under 35 U.S.C. 371 of International Patent Application Serial No. PCT/US2019/037835, filed Jun. 19, 2019, and published as WO 2020/005650 A1 on Jan. 2, 2020, which claims priority to Chinese Application No. 201810706012.4, filed Jun. 26, 2018, which applications and publication are incorporated herein by reference in their entirety.

BACKGROUND

Image colorization refers to transferring a grayscale image to a color image. The image colorization in various scenarios, such as colorizing old pictures, black-and-white films, and the like. Since a grayscale image has only luminance information, the purpose of image colorization is to superimpose color on the grayscale image. The target of the image colorization is to make the generated color image perceptually meaningful and visually appealing. A number of possible colors may be allocated to a particular pixel or region in the grayscale image. For example, leaves in a grayscale image may be colorized in green, yellow, red, brown, or others. In such case, it is difficult to obtain a unique correct image colorization solution.

SUMMARY

In accordance with implementations of the subject matter described herein, there is provided a solution for image colorization based on reference information. In this solution, a similarity is determined between contents presented in a grayscale source image and a color reference image, and a color target image corresponding to the grayscale source image is determined based on the similarity by using a learning network. Specifically, a first set of blocks of the grayscale source image similar to the color reference image in content and a second set of blocks of the grayscale source image dissimilar to the color reference image in content are determined based on the similarity; a first color is determined for the first set of blocks based on a color of blocks in the color reference image corresponding to the first set of blocks; a second color for the second set of blocks is determined independently of the color reference image; and the grayscale source image is transferred based on the first and second colors to generate the color target image. Through this solution, it is possible to provide user controllability and customized effects in the image colorization. In addition, there is no strict requirement on correspondence between the color reference image and the grayscale source image, thereby having more robustness to selection of color reference images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference symbols refer to the same or similar elements.

DETAILED DESCRIPTION OF EMBODIMENTS

Figure 1:
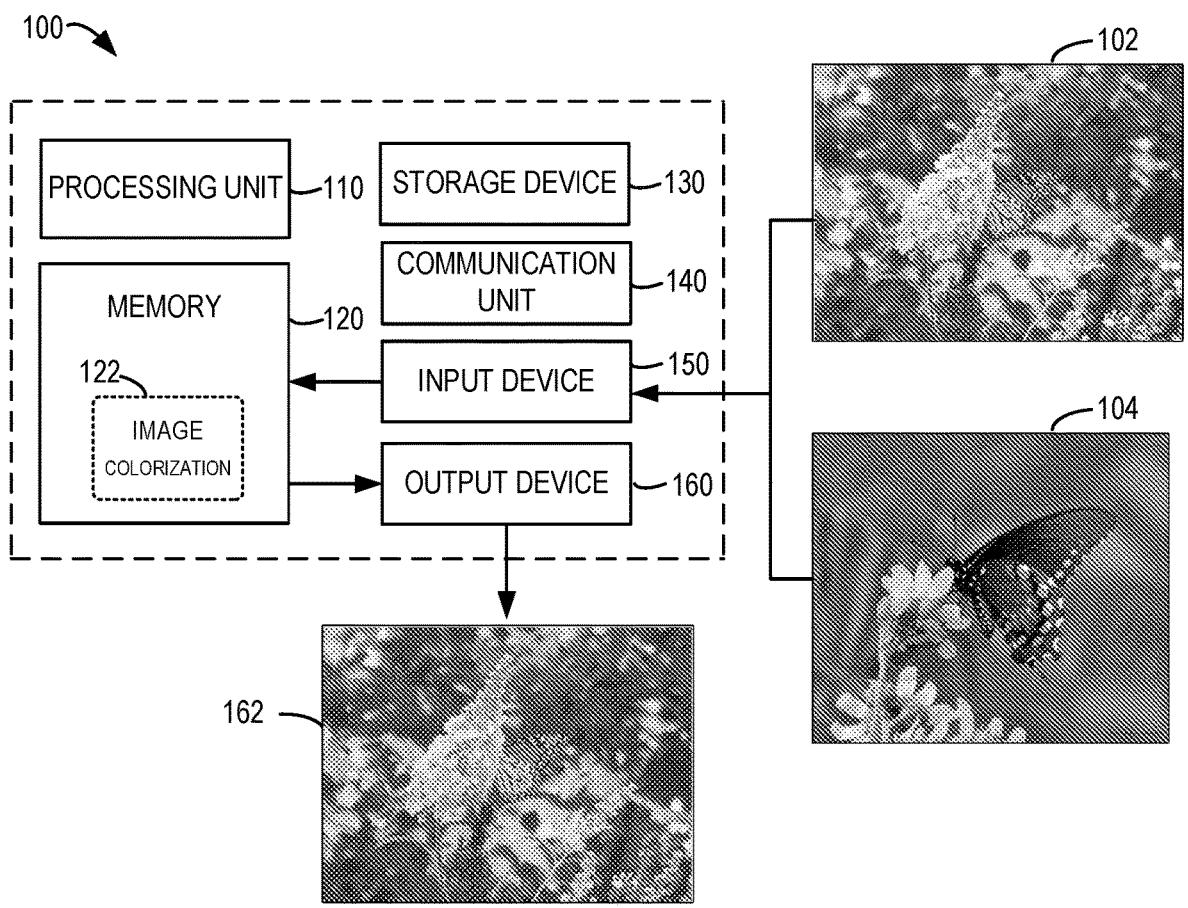
FIG. 1 illustrates a block diagram of a computing environment in which various implementations of the subject matter described herein can be implemented.

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter described herein.

As used herein, the term "include" and its variants are to be read as open terms that mean "include, but are not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or the same objects. Other definitions, explicit and implicit, may be included below.

As used herein, the term "grayscale image" refers to an image in which each pixel has only one value representing the luminance. The grayscale image is sometimes referred to as a monochrome image. This type of image is typically displayed with a gray scale ranged from the darkest black to the brightest white. If a pixel only represents either a dark value or a white value, the grayscale image is also referred to a black-and-white image. The term "color image" refers to an image in which each pixel includes specific color values. Typically, in the color image, each pixel has coordinate values in a corresponding color space, including values defining the color. Generally, three channels in a color space are sufficient to represent a color. Pixel values corresponding to different channels in the color image can represent luminance and chrominance. The color image can be represented in color spaces such as Iab, RGB, YCbCr, HSV, and the like, and it is possible to mutually convert between those color spaces.

As mentioned above, in image colorization, since there are too many colors applicable to different pixels or regions in a grayscale image, it is difficult to obtain a better image colorization solution. In the legacy solution, manual intervention information plays an important role in the image colorization process. Such manual intervention information is generally provided in the following two forms: user manual labeling or a color reference image. In the solution based on user manual labeling, the user needs to label a color(s) at one or more points of different regions of the grayscale image, and the color(s) labelled by the user is then rendered across the whole regions. This requires the user to have both experience and a good sense of aesthetics, thus making it challenging for an untrained user.

The other form is to obtain a color image from the user as reference information and use colors presented in the color image to colorize the grayscale image. This solution is more flexible and can be achieve user customization. There have been proposed some image colorization solutions based on a color reference image. Those solutions include identifying correspondence between partial regions of the color reference image and the grayscale image and propagating colors from corresponding regions of the color reference image to those of the grayscale image. However, the colorization quality of those solutions depends heavily on the choice of the color reference image. Since the correspondence on the basis of the original images is taken into account, disparities between the color reference image and the grayscale image may be caused by dissimilarity in any of lighting, viewpoint, content, and other aspects, which may mislead the algorithms proposed in these solutions, thereby generating poor colorization results.

Considering that a single color image can provide limited reference colors for use, there is proposed a fully automatic image colorization solution which leverages a huge reference image database to search a similar image pixel or block for colorization. As the deep learning technology develops, it has been found that a deep learning network can output impressive results when modeling large-scale data. Therefore, some existing solutions model the image colorization as a regression problem, and then a deep learning network can be directly used to determine a color image corresponding to a grayscale image. By means of learning, these solutions cans fully automatically determine a color(s) for a grayscale image without requiring any manual color labelling or reference image.

Unfortunately, these solutions do not allow multi-modal colorization. By training a deep learning network from a large amount of training data, the obtained deep learning network generally uses a dominant color that it has learned to color a certain block. For example, if leaves are presented yellow in a majority of images related to leaves in the training data, the trained deep learning network will render the color of leaves with yellow when colorizing all input grayscale images that contain the leaves. Such unimodality restricts the colorization results, preventing the user from controlling or customizing the colors of the grayscale image as needed. Moreover, such solution further requires images covering as many objects as possible for the training of the learning network.

In implementations of the subject matter described herein, there is provided a solution for image colorization based on reference information. In the solution, a color reference image is used to colorize a grayscale image to obtain a corresponding color target image. With the color reference image, it is possible to provide user controllability and customized effects. In addition, a learning network is used to perform an image colorization process automatically. By use of the learning network, a color of corresponding blocks in the color reference image is determined for blocks in the grayscale source image similar to the color reference image in content, and a color is determined, independently of the color reference image, for blocks in the grayscale source image dissimilar to the color reference image. In this solution, no requirement is imposed to exact correspondence between the color reference image and the grayscale source image, and the image colorization result therefore is more robust for the choice of the reference image.

Example Environment

Basic principles and various example implementations of the subject matter described herein will now be described with reference to the drawings. FIG. 1 illustrates a block diagram of a computing device 100 in which implementations of the subject matter described herein can be implemented. It would be appreciated that the computing device 100 described in FIG. 1 is merely for purpose of illustration and not limit the function and scope of implementations of the subject matter described herein in any manners. As shown in FIG. 1, the computing device 100 includes a computing device 100 in a form of general computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 may be implemented as any user terminal or service terminal having the computing capability. The service terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processing based on programs stored in the memory 120. In a multi-processor system, multiple processing units execute computer-executable instructions in parallel so as to improve the parallel processing capacity of the computing device 100. The processing unit 110 may also be referred to as a central processing unit (CPU), microprocessor, controller or microcontroller.

The computing device 100 typically includes various computer storage medium. Such medium can be any medium accessible by the computing device 100, including, but not limited to, volatile and non-volatile medium, and detachable and non-detachable medium. The memory 120 may be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any detachable or non-detachable medium and may include machine-readable medium, such as a memory, flash drive, disk or any other medium, which can be used for storing information and/or data and accessed in the computing device 100.

The computing device 100 may further include additional detachable/non-detachable, volatile/non-volatile memory medium. Although not shown in FIG. 1, a disk drive is provided for reading from and/or writing into a removable and non-volatile disk and a disc drive is provided for reading from and/or writing into a removable non-volatile disc. In such cases, each drive may be connected to a bus (not shown) via one or more data medium interfaces.

The communication unit 140 communicates with a further computing device via communication medium. In addition, the functions of the components in the computing device 100 may be implemented by a single computing cluster or multiple computing machines that can communicate via communication connections. Therefore, the computing device 100 can operate in a networking environment using a logical link with one or more other servers, network personal computers (PCs) or further general network nodes.

The input device 150 may be one or more of a variety of input devices, such as a mouse, keyboard, tracking ball, voice-input device, and the like. The output device 160 may be one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (I/O) interfaces (not shown).

In some implementations, as an alternative of being integrated on a single device, some or all components of the computing device 100 may also be arranged in form of cloud computing architecture. In the cloud computing architecture, the components may be provided remotely and work together to implement the functions described in the subject matter described herein. In some implementations, cloud computing provides computing, software, data access and storage service, which will not require end users to be aware of the physical positions or configurations of the systems or hardware providing these services. In various implementations, the cloud computing provides the services via a wide region network (such as Internet) using proper protocols. For example, a cloud computing provider provides applications over the wide region network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functions described herein from a service provider at a remote location. Alternatively, they may be provided from a conventional server or installed directly or otherwise on a client device.

The computing device 100 can be used to implement image colorization in multiple implementations of the present disclose. The memory 120 may include one or more image colorization modules 122, which each includes one or more program instructions and can be accessed and operated by the processing unit 110 to implement the functionalities of various implementations described herein.

When performing the image colorization, the computing device 100 receives a grayscale source image 102 from the input device 150. Moreover, the implementations of the subject matter described herein can implement the image colorization based on a color reference image, and therefore the computing device 100 can also receive a color reference image 104 via the input device 150. The grayscale source image 102 and the color reference image 104 obtained by the input device 150 can be provided as inputs to the image colorization module 122. The image colorization module 122 determines a color of a region and/or a pixel in the grayscale source image 102 based on the color reference image 104, so as to transfer the grayscale source image 102 into a corresponding color target image 162. The color target image 162 is a colored version of the grayscale source image 102, in which the presented content is consistent with that of the grayscale source image 102, but each pixel includes both luminance information and chrominance information to represent the respective color. The output device 160 can present the color target image 162 to a user or transmit the same to other devices.

It would be appreciated that the grayscale source image 102, the color reference image 104 and the color target image 162 shown in FIG. 1 are provided for the purpose of illustration. In other examples, any grayscale images can be processed and any color image can be used as the reference image.

Work Principles

Figure 2:
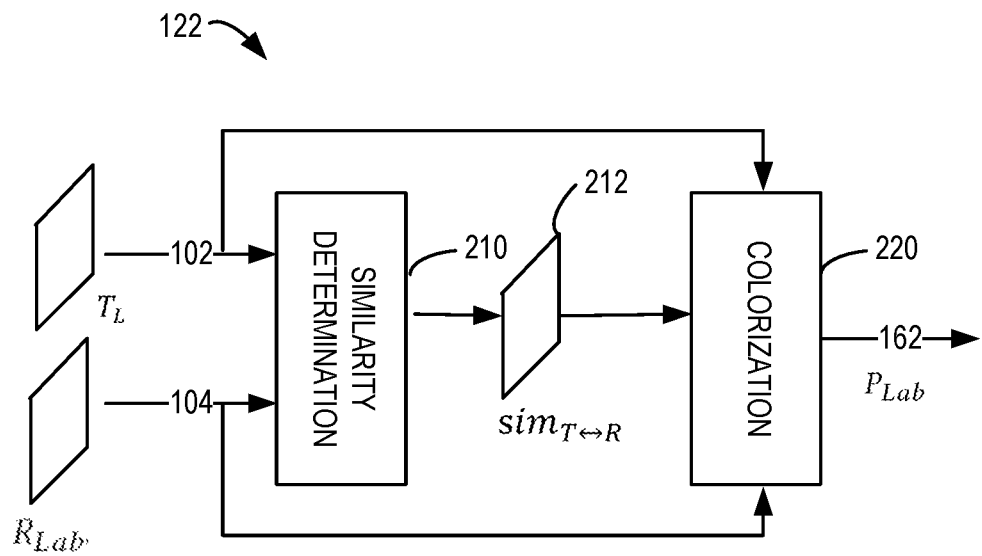
FIG. 2 illustrates a block diagram of learning network architecture for image colorization in accordance with an implementation of the subject matter described herein.

The image colorization of the subject matter described herein will now be described below with reference to FIG. 2. FIG. 2 illustrates an image colorization module 122 in accordance with some implementations of the subject matter described herein. The image colorization module 122 is provided for colorizing a grayscale source image using a color reference image. According to the implementations of the subject matter described herein, one objective of the image colorizing module 122 is to colorize the grayscale source image 102 based on the input color reference image 104, so as to determine the color target image 162 that is corresponding to the grayscale source image 102. In the image colorization based on the color reference image, it is desirable to selectively propagate a color in the color reference image to a block in the grayscale source image that is similar to the color reference image in content, and to predict a reasonable and natural color for a block in the grayscale source image that is unrelated to the color reference image.

As shown in FIG. 2, the image colorization module 122 includes a similarity determination module 210 and a colorization module 220. The similarity determination module 210 is configured to determine a similarity 212 between contents presented in the grayscale source image 102 and the color reference image 104. Content presented in an image may also be referred to a semantic meaning represented by the image, including image objects contained in the image such as persons, animals, natural features, buildings and the like. A content similarity between two images may also be referred to as a semantic similarity between the two images. The similarity determined by the similarity determination module 210 can be used by the colorization module 220 as a reference for colorization of the grayscale source image 102.

The grayscale source image 102 to be colorized may be provided or indicated by a user. For example, the grayscale source image 102 may be any grayscale image obtained through a user input or in any other manner. In some further implementations, a color image may be obtained from a user or from any other source, and then is transferred into the grayscale source image 102 for processing. As a reference for colorization, the color reference image 104 may also be provided by the user. For example, in the example as shown in FIG. 1, the input device 150 of the computing device 100 receives the color reference image 104 provided by the user. In some further implementations, the color reference image 104 may be recommended automatically based on the grayscale source image 102, which will be described in detail below.

The pixel values of the grayscale source image 102 and the color reference image 104 can be represented in a color space. For purpose of description, a CIE Lab color space is taken as an example herein. In the CIE Lab color space, each pixel of the image has values corresponding to three channels, including a value for the luminance "L" channel and respective values for the "a" and "b" channels. The "a" channel represents a color range from green to red and the "b" channel represents a color range from blue to yellow. According to the CIE Lab color space, each pixel of the image can be represented with three values corresponding to the L, a, and b channels. It would be appreciated that different color spaces are mutually transferable, and the image 102 and 104 thus can be represented in other color spaces if required.

As a grayscale image, the grayscale source image 102 only has a value corresponding to the luminance channel L, and the values corresponding to the a and b channels are both zero. Therefore, the grayscale source image 102 may be expressed as $T_L \in \mathcal{R}^{H \times W \times 1}$, where H and W represent a height and a width of the grayscale source image 102, respectively. As a color image, the color reference image 104 has values corresponding to the three channels to present the respective luminance and chrominance. The color reference image 104 may be expressed as $R_{Lab} \in \mathcal{R}^{H \times W \times 3}$, where H and W represent a height and a width of the color reference image 104, respectively. In the example, it is supposed that the grayscale source image 102 and the color reference image 104 are of the same dimension though it is not necessary. Images having different dimensions can map to each other.

In some implementations, the similarity determination module 210 may determine the similarity 212 between contents presented in the grayscale source image 102 and the color reference image 104 pixel by pixel. Hence, the similarity 212 may be represented in form of a similarity map in which each pixel corresponds to a similarity (or disparity) between at least parts (for example, the pixels) of the grayscale source image 102 and the color reference image 104.

In some implementations, in order to provide more information to the colorization module 220, a bidirectional similarity can be determined. Specifically, the similarity determination module 210 can determine a first directional similarity (represented as $sim_{T \rightarrow R}$) from the grayscale source image 102 to the color reference image 104 and a second directional similarity (represented as $sim_{T \rightarrow R}$) from the color reference image 104 to the grayscale source image 102. The first directional similarity $sim_{T \rightarrow R}$ indicates a matching confidence from the content presented in the grayscale source image 102 and the content presented in the color reference image, and the second directional similarity $sim_{T \rightarrow R}$ indicates a matching confidence in a reverse direction. The similarities in the two directions can be represented as $sim_{T \leftrightarrow R}$. In some implementations, the similarity determination module 210 may only determine a unidirectional similarity because the result of the module 210 only serves as a reference for the subsequent colorization module 220. The colorization module 220 may further optimize its output on that basis. Various techniques, either currently presented or to be developed in the future, may be used to determine the unidirectional or bidirectional similarity between the two images. An example will be described in detail below with reference to FIG. 3, but the scope of the subject matter described herein is not limited in this regard.

The similarity provided by the similarity determination module 210 is provided to the colorization module 220. The colorization module 220 determines the color target image 162 corresponding to the grayscale source image 102 using a deep learning method. Specifically, the colorization module 220 performs the colorization using a deep learning network. Therefore, the colorization module 220 may also be referred to as a colorization learning network 220 hereinafter. Here, a deep learning network may also be referred to as a "learning network," neural network," or "learning model." In the following, the terms "learning model," "learning network," "neural network," "model," and "network" can be used interchangeable.

In the implementation of FIG. 2, it is supposed that the colorization learning network 220 has been trained and learned how to select colors from the color reference image for the respective pixels or regions in the grayscale source image, propagate the colors to the color target image and predict colors of other pixels or regions of the grayscale source image. Training of the colorization learning network 220 will be described in detail below. After the training, a parameter set of the colorization learning network 220 is determined. When being used, inputs of the colorization learning network 220 include the similarity 212, the grayscale source image 102, and the color reference image 104. The colorization learning network 220 can process the input similarity 212, the grayscale source image 102, and the color reference image 104 to determine the color target image 162.

In the colorization learning network 220, the similarity 212 is used to identify where in the grayscale source image 102 to which the corresponding colors from the color reference image 104 can be applied and where cannot (because the similarity 212 indicates that the two images are largely different in content at those locations). For those locations where the colors from the color reference image 104 cannot be applied, it is required to predict their colors otherwise. Specifically, the colorization learning network 220 determines, based on the similarity 212, a first set of blocks in the grayscale source image 102 that are similar to the color reference image 104 in content and a second set of blocks that are dissimilar to the color reference image 104 in content. Here, a block may be a processing unit of the image, which may be in unit of pixel, superpixel, or an image portion of any other size.

The colorization learning network 220 may determine a first color(s) for the first set of blocks based on a color(s) of blocks in the color reference image 104 corresponding to the first set of blocks. Similar blocks in the color reference image 104 refer to blocks determined to be similar to the first set of blocks in content based on the similarity 212. For the second set of blocks in the grayscale source image 102, since no corresponding blocks are found from the color reference image 104, the colorization learning network 220 can determine a second color(s) for the second set of blocks independently of the color reference image 104. The colorization learning network 220 learns from training data the capability of predicting the second colors during the training process. In some implementations, the colorization learning network 220 may predict colors suitable for the second set of blocks, for example, for the content presented in the second set of blocks. For example, through the training process, the colorization learning network 220 may determine that blue is suitable for the second set of blocks for sky, or that a color for skin is suitable for the second set of blocks of human skin. In this way, the colors of the blocks in the color reference image 104 that are related to the grayscale source image 102 can be propagated to the first set of blocks, and colors of other blocks in the grayscale source image 102 can be predicted reliably. The capability of the colorizing learning network 220 in predicting colors for the dissimilar blocks can be accomplished through the learning and training process. Through the learning and training process, the colorization learning network 220 may use a color(s) learned from blocks similar to the second set of blocks in content as the second color(s). This can be better understood from the training process of the learning network described below.

The colorization learning network 220 may then transfer the grayscale source image 102 based on the first and second colors to generate the color target image 162 (represented as $P_{Lab}$). For example, the colorization learning network 220 may combine the first set of blocks having the first colors and the second set of blocks having the second colors as the color target image. In some implementations, when determining the first and second colors, the colorization learning network 220 may only determine chrominance information for the first and second sets of blocks. When generating the color target image 162, the luminance information in the color target image 162 remains the same with that in the grayscale source image 102 (for example, the value corresponding to the L channel remains unchanged). Therefore, the colorization learning network 220 may only determine values for the a and b channels of the first and second sets of blocks, so as to obtain a chromatic image (represented as $P_{ab}$) of the a and b channels of the color target image 162. The color target image 162 $P_{Lab}$ can be obtained by composing the grayscale source image 102 and the chromatic image.

According to the implementations of the subject matter described herein, the usage of the color reference image can provide user controllability and achieve better customized effects. In addition, when a learning network is used to propagate colors of a reference image to related blocks in a grayscale image and predict colors of unrelated blocks independently of the color reference image, there is no need for exact correspondence between the color reference image and the grayscale image, which makes the image colorization result more robust to the selection of the color reference image.

In some implementations, the image colorization module 122 may also colorize video frames such that colors can be presented for a video having only luminance information (for example, an old movie). During the colorization of the video, a same color reference image may be selected for a video clip and each frame in the video clip is taken as a grayscale source image for processing.

Similarity Determination

Figure 3:
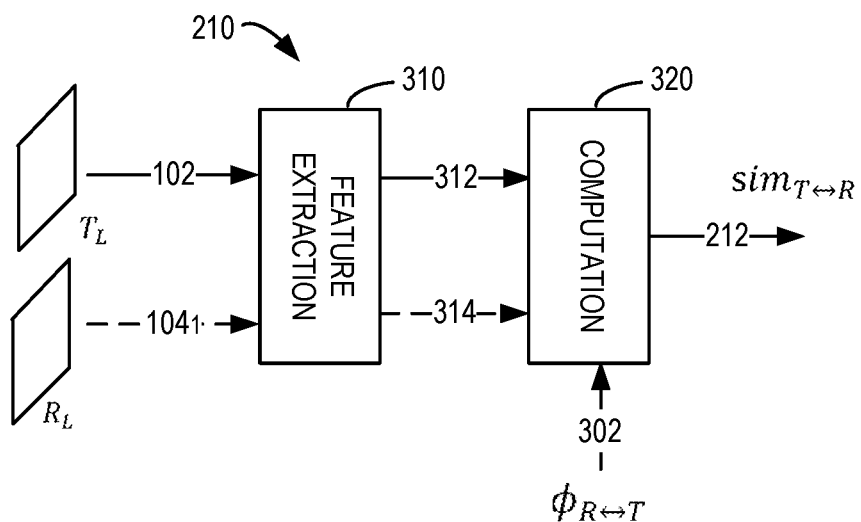
FIG. 3 illustrates a block diagram of the similarity determination learning network in FIG. 2 in accordance with an implementation of the subject matter described herein.

As mentioned above, the similarity determination module 210 may determine a unidirectional or bidirectional similarity between two images using various techniques. FIG. 3 illustrates an example implementation of the similarity determination module 210. Since the similarity determination module 210 is to measure a similarity between contents presented in the source image 102 and the reference image 104, the similarity determination module 210 in the example of FIG. 3 may omit the chrominance information in the color reference image 104 and take only the luminance information into account. Specifically, the similarity determination module 210 may determine a grayscale reference image $104_1$ (represented as $R_L$) corresponding to the color reference image 104 ($R_{Lab}$)). This may be accomplished by extracting pixel values corresponding to the luminance channel (for example, the L channel) of the color reference image 104.

In the example of FIG. 3, the similarity determination module 210 may measure the similarity between contents presented in the source image 102 and the reference image 104 in a feature space. The similarity determination module 210 includes a feature extraction module 310 and a computation module 320. The feature extraction module 310 may be implemented based a learning network, and may also be referred to as a feature extraction learning network 310. The grayscale source image 102 and the grayscale reference image $104_1$ are provided to the feature extraction learning network 310, respectively, so as to extract a first feature map 312 and a second feature map 314. The first feature map 312 and the second feature map 314 may be extracted at least as high-level feature maps of the grayscale source image 102 and the grayscale reference image $104_1$, respectively.

In some implementations, the feature extraction learning network 310 may be based on a convolutional neural network (CNN). Feature extraction of the CNN is a well-known technique in the deep learning field, details of which are omitted herein. In some implementations, the CNN-based feature extraction learning network 310 may include a plurality of cascaded convolutional layers, and a plurality of respective feature maps may be obtained from these convolutional layers to form a multilevel feature map in a pyramid structure. In the CNN-based learning network, a low-level feature map in the cascading structure generally characterizes a texture of the image, while a high-level feature map generally characterizes a semantic meaning of the image. For the grayscale images 102 and $104_1$, their multilevel feature maps can be represented as $F_{L_T}^{i}$ and $R_{R_L}^{i}$, respectively, where the value of i indicates a level in the pyramid structure. In some implementations, feature maps at a higher level (for example, the value of i is greater) is selected from the multilevel feature maps of the grayscale images 102 and $104_1$. In some further implementations, the multilevel feature maps of the grayscale images 102 and $104_1$, including the low-level and high-level feature maps, may all be considered when calculating the similarity. The feature maps obtained from different convolutional layers may be of different sizes due to downsampling, and may be converted to have the same size by upsampling or downsampling the feature maps.

In some implementations, a pre-trained learning network, especially the part of the learning network that is related to feature extraction trained for image object identification or classification, may be used as the feature extraction learning network 310 because the learning network for the object identification or classification is capable of encoding a full spectrum feature map of an image. By utilization of the pre-trained learning network, the separate training time may be saved effectively. Since such learning network may be trained by using color images as its training data, to reduce a performance gap between the color images and their grayscale images, in some implementations, the grayscale images may be used as training data to fine tune the existing learning network. Such training process may not require much time and computing complexity. Of course, the grayscale images may also be used as training data to separately train a new learning network as the feature extraction learning network 310, with a training objective of object identification or classification of images. As such, the training data may include ground-truth object identification results or ground-truth classes corresponding to the grayscale images.

The first feature map 310 and the second feature map 314 extracted by the feature extraction learning network 310 for the grayscale source image 102 and the grayscale reference image 104₁ are provided to the computation module 320. The computation module 320 determines a content similarity based on a difference between the first feature map 312 and the second feature map 314 (for example, a difference between respective pixels in the two feature maps). The corresponding pixels of the first feature map and the second feature map may be determined by aligning the grayscale source image 102 and the color reference image 104 (or the grayscale reference image 104₁), which requires determination of a mapping between the two images. The mapping between one image and another image indicates correspondence between certain pixel locations in the one image and certain pixel locations in the other image, and thus may be referred to as correspondence of the images.

In some implementations, if a first directional similarity from the grayscale source image 102 to the color reference image 104 is to be determined, a first directional mapping (represented as $\phi_{T\to R}$) from the grayscale source image 102 to the color reference image 104 (or the grayscale reference image 104₁). The first directional mapping $\phi_{T\to R}$ indicates a mapping from pixel locations of the grayscale source image 102 to pixel locations of the color reference image 104 (or the grayscale reference image 104₁). In other words, for any pixel location p in the grayscale source image 102, a mapped location q corresponding to the location p in the color reference image 104 (or the grayscale reference image 104₁) may be determined through the first directional mapping. The respective pixels at the two locations are referred to as corresponding pixels of the two images.

In some implementations, if a second directional similarity from the color reference image 104 to the grayscale source image 102 is to be determined, a second directional mapping (represented as $\phi_{R\to T}$) from the color reference image 104 (or the grayscale reference image 104₁) may be determined. Similarly to the first directional mapping, the second directional mapping may be used to map a pixel location of the color reference image 104 (or the grayscale reference image 104₁) to a pixel location of the grayscale source image 102. Of course, if a bidirectional similarity is to be determined, mappings in the two directions may be determined. The first directional mapping $\phi_{T\to R}$ and the second directional mapping $\phi_{R\to T}$ may be represented collectively as a bidirectional mapping $\phi_{R\to T}$.

There are various techniques that can be used to determine the unidirectional or bidirectional mapping between two images. In some implementations, a dense correspondence algorithm, such as a SIFTFlow algorithm, Daisy Flow algorithm, DeepFlow algorithm or the like, may be used to determine the unidirectional or bidirectional mapping between two images. In some implementations, a dense matching technique, referred to as Deep Image Analog, may also be used to determine the unidirectional or bidirectional mapping between the grayscale source image 102 and the color reference image 104 (or the grayscale reference image 104₁). This technique can match images that are visually different but semantically related so as to determine a mapping relationship between the images.

The unidirectional or bidirectional mapping 302 (the bidirectional mapping is illustrated in FIG. 3) between the grayscale source image 102 and the color reference image 104 (or the grayscale reference image 104₁) may be provided to the computation module 320 to determine corresponding pixels between the first feature map 312 and the second feature map 314, and further determine a similarity between the corresponding pixels. Since the first feature map 312 is extracted from the grayscale source image 102 while the second feature map 314 is extracted from the grayscale reference image 104₁, the pixel locations in the two feature maps have one-to-one correspondence for the locations in the images 102 and 104₁, and the corresponding pixels between the feature maps 312 and 314 may be determined through the mapping between images 102 and 104. As mentioned above, the multilevel feature maps $F_{T_L}^{i}$ and $F_{R_L}^{i}$ of the images 102 and 104 may be extracted, where i is valued from a plurality of continuous integers. For each pair of feature maps, a similarity therebetween may be determined.

Specifically, when determining the first directional similarity $sim_{T\to R}$ for a pair of first feature map $F_{T_L}^{i}$ and second feature map $F_{R_L}^{i}$, the first directional mapping $\phi T \to R$ is used to determine a corresponding pixel (represented as $F_R^{i}(\phi T\to R(p))$) in the second feature map for a certain pixel p (represented as $F_T^{i}(p)$) in the first feature map. Then, the computation module 320 determines the first directional similarity between the two pixels. This may be expressed as follows:

$$sim_{T\to R}^{i}(p)=d(F_T^{i}(p),F_R^{i}(\phi_{T\to R}(p))) \quad (1)$$

where d(x,y) represents a similarity measure function. Various similarity measure methods may be used to measure a similarity between two pixels. In an example, a cosine similarity measure method may be used to measure a similarity between two pixels, and the similarity measure function d(x,y) may be defined as follows:

$$d(x, y) = \frac{xy}{|x||y|} \quad (2)$$

It would be appreciated that any other similarity computation method may also be used.

When determining the second directional similarity $sim_{R\to T1}$, for a pair of first feature map $F_T^{i}$ and second feature map $F_R^{i}$, corresponding pixels in the two feature maps are determined through a bidirectional mapping so as to satisfy bidirectional consistency and symmetry. Thus, the corresponding pixels in the two feature maps may be determined as $F_T^{i}(\phi_{R\to T}(\phi_{T\to R}(p)))$ and $F_R^{i}(\phi_{T\to R}(p))$. The computation module 320 then determines the second directional similarity between the two pixels. This may be expressed as follows:

$$sim_{R\to T}^{i}(p)=d(F_T^{i}(\phi_{R\to T}(\phi_{T\to R}(p))),F_R^{i}(\phi_{T\to R}(p))) \quad (3)$$

where the similarity measure function d(x,y) may be the cosine similarity measure function given for Equation (2) or any other similarity measure function.

The computation module 320 may determine the similarity between each level of the feature maps of the grayscale source image 102 and the grayscale reference image 104₁, and provide the determined similarity to the colorization module 220 for the image colorization. In some implementations, the computation module 320 may perform a weighted combination of the similarities determined from the multilevel feature maps to obtain a final similarity between the grayscale source image 102 and the color reference image 104. In some further implementations, the computation module 320 may only determine a similarity between feature maps at a certain level as the final similarity between the grayscale source image 102 and the color reference image 104.

In some implementations, in order to enable the subsequent colorization learning network 220 to more accurately determine, based on the similarity, whether corresponding blocks (for example, individual pixels or blocks consisting of a plurality of pixels) between the grayscale source image 102 and the color reference image 104 are similar, the image colorization module 122 may include a further module (not shown) for warping the color reference image 104 (for example, warping the chromatic image $R_{ab}$) based on the bidirectional mapping between the grayscale source image 102 and the color reference image 104 as an input to the colorization learning network 220. The warped chrominance information for the color reference image 104 is $R_{ab}'=R_{ab}(\phi_{R \to T}(\phi_{T \to R}(p)))$. As such, the colorization learning network 220 may determine, based on the unidirectional or bidirectional similarity, whether the corresponding pixels of the grayscale source image ($T_L$) and the warped chrominance information $R_{ab}'$ for the color reference image 104 are sufficiently similar (or matched), so as to identify the first set of blocks similar in content and the second set of blocks dissimilar in content.

Training of Colorization Learning Network

As described above, the colorization learning network 220 in FIG. 2 may learn the capability of the following: determining blocks of the grayscale source image 102 and the color reference image 104 that are similar in content, propagating a color of a similar block in the color reference image 104 to the grayscale source image 102, and predicting colors for other blocks in the grayscale source image 102. In order to enable the colorization learning network 220 to learn such capability, a training process is required to determine the parameter set of the colorization learning network 220.

The colorization learning network 220 may consist of a large number of learning units (also referred to as neurons). In some implementations, the colorization learning network 220 may also be based on a CNN structure. In some implementations, a learning network in any other similar architecture may be used as well. Through the training process, respective parameters of these neurons are determined to process the inputs and provide desired outputs. Various types of learning networks may be employed. The training process of the learning network involves updating continuously a parameter set of the learning network on the basis of the training data using a training algorithm. The objective of the parameter updating is implemented by continuously reducing (or minimizing) a loss function or continuously augmenting (or maximizing) a cost function. For purpose of description, the loss function is taken as an example herein. Through the training, the learning network may be able to determine a desired output for a given output.

Typically, the objective of image colorization is to encourage the chrominance information (namely $P_{ab}$) in the color target image $P_{Lab}$ output by the learning network to be as close as possible to the chrominance information (namely $T_{ab}$) in the ground-truth color image $T_{Lab}$ corresponding to the grayscale source image (for example, the difference is as small as possible). However, this is not suitable for image colorization based on reference information because it is further desired that $P_{ab}$ in the color target image can vary with the chrominance information provided by different color reference images, such as $R_{ab}$. For example, it is desired that the learning network is capable of determining a flower in the grayscale image as red, yellow, or purple based on a color reference image. Therefore, if the difference between the color target image $P_{Lab}$ and the ground-truth color image $T_{Lab}$, in particular the difference between the chrominance information $P_{ab}$ and $T_{ab}$, is directly penalized, the colorization learning network 220 may be trained to operate only in a single modal state and determine a single color for the same object in different grayscale images. This cannot achieve the user controllability and customized effects brought up by the color reference image.

In the implementations of the subject matter described herein, there are two aspects considered in the learning objective of the colorization learning network 220. The first aspect is to preferably apply reliable reference colors from the color reference image to the output color target image, thereby making the network output faithful to the color reference image as much as possible. The second aspect is to encourage the colorization learning network 220 to predict reasonable, natural colors when it is unable to find reliable reference colors from the color reference image, so as to make the colorization result perceptually meaningful.

Figure 4:
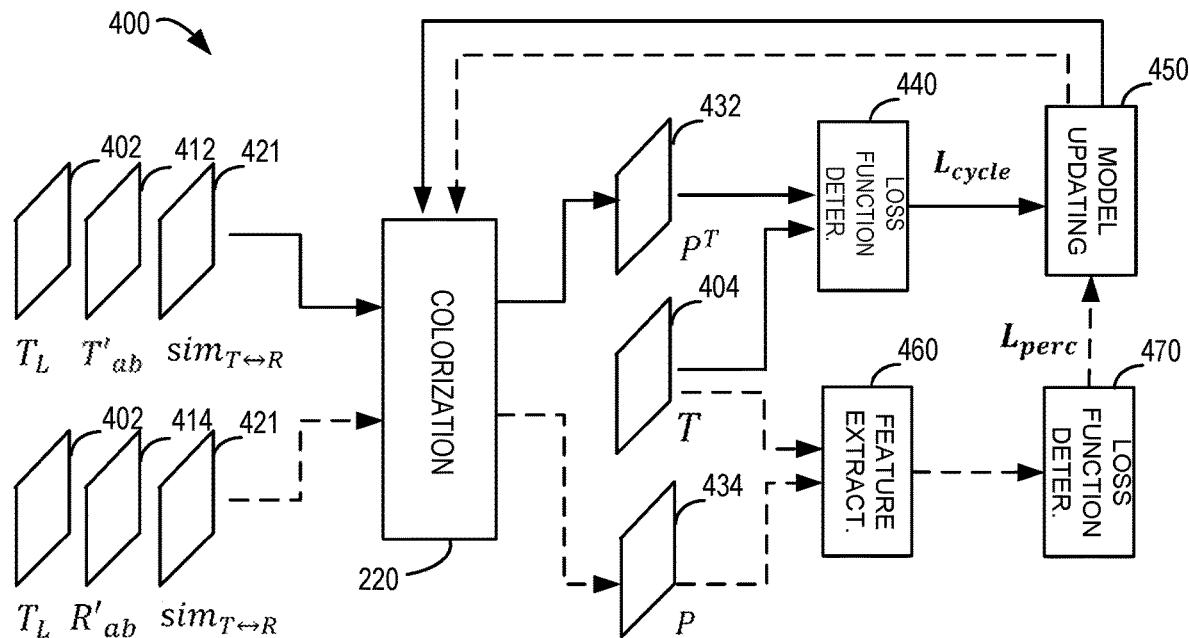
FIG. 4 illustrates a diagram of training architecture for training the colorization learning network in FIG. 2 in accordance with an implementation of the subject matter described herein.

To accomplish the learning objective, there is proposed a multi-task learning training method for training the colorization learning network 220. FIG. 4 illustrates a block diagram of a training architecture 400 for training the colorization learning network 220. In the training architecture 400, two training branches are used to support multi-task learning, so as to accomplish the learning objective of the colorization learning network 220. The two training branches share the colorization learning network 220 (represented as C) and its parameter set (represented as θ), but have respective training data and loss functions.

The first training branch may be referred to as a cycle branch, which is to enable the colorization learning network 220 to selectively propagate correct reference colors in the color reference image, depending on a match degree (for example, a similarity) between the grayscale source image $T_L$ and the color reference image (for example, a grayscale reference image $R_L$ corresponding to the color reference image.) The second training branch may be referred to as a perceptual branch, which is to enable the colorization learning network 220 to predict reasonable colors for blocks of the grayscale source image where there is no appropriate reference color.

In the first training branch, data for the training includes a grayscale source image $T_L$ and a ground-truth color image $T_{Lab}$ corresponding to the grayscale source image. This pair of images is fully matched in content, but the ground-truth color image $T_{Lab}$ further includes chrominance information. In practice, the ground-truth color image $T_{Lab}$ may be obtained first, and the grayscale information therein may be extracted as the grayscale source image $T_L$. In the second training branch, data for the training includes a grayscale source image $T_L$ and a possible color reference image $R_{Lab}$. Such color reference image $R_{Lab}$ is used to enable the colorization learning network 220 to learn reliable colors.

As described above with reference to FIG. 2, the inputs of the colorization learning network 220 further include a similarity between contents presented in a grayscale source image and a color reference image. In some implementations, the colorization learning network 220 may be trained independently of the similarity determination module 210 (supposing that the similarity determination module 210 is also implemented based on a learning network). The similarity determination module 210 may first be trained, and then used to determine the similarity between the grayscale source image and the color reference image of the colorization learning network 220. At this time, the determined similarity is believed to be correct and not changed. In some further implementations, the colorization network 220 may be trained jointly with the similarity determination module 210 (which may be referred to as a similarity determination learning network 210 here). In this process, the parameter set of the similarity determination learning network 210 may be updated jointly through the determined similarity. In either of the cases, the grayscale image and the color reference image for training the colorization learning network 220 may be input to the similarity determination module 210 to determine a respective similarity.

In the training process, the colorization learning module 220 may be initialized, for example, its parameter set may be initialized as random values. Training of the two training branches may be executed separately for updating the colorization learning network 220. For example, the colorization learning network 220 may be updated first in the cycle branch and then in the perceptible branch. In some implementations, the update may be performed in stages, for example, may be performed in the cycle branch for a plurality of times and then in the perceptual branch, so as to determine the final parameter set of the learning network 220. In some implementations, the update may be performed alternately, for example, the update in the cycle branch and the perceptual branch is continuously repeated until the final parameter set of the colorization learning network 220 is determined.

The updating of the learning network in the cycle branch will be first described. As mentioned above, in the cycle branch (which is indicated with a solid arrow in FIG. 4), training data for updating the colorization learning network 220 includes a grayscale source image $T_L$ (denoted as 402), a ground-truth color image $T_{Lab}$ corresponding to the grayscale source image, and a similarity $sim_{T \leftrightarrow R}$ (denoted as 421) between the grayscale source image. $T_L$ and the color reference image $R_{Lab}$ determined by the similarity determination module 210. In some implementations of colorization as described above, the chromatic image in the color reference image is input to the colorization learning network 220, and the color reference image may be further warped based on the bidirectional mapping $\phi_{T \rightarrow R}$; $\phi_{R \rightarrow T}$ between the grayscale source image and $T_L$ the color reference image $R_{Lab}$. Therefore, in the training process, the ground-truth color image $T_{Lab}$ may be processed likewise. For example, the chromatic image (i.e., $T_{ab}$) in the ground-truth color image is wrapped to obtain $T_{ab}'=T_{ab}(\phi_{R \rightarrow T}(\phi_{T \rightarrow R}(p)))$ (denoted as 412 in FIG. 4). The bidirectional mapping $\phi_{T \rightarrow R}$ and $\phi_{R \rightarrow T}$ used here is to satisfy cyclic consistency, namely $T_{ab}'(p)=T_{ab}(\phi_{R \rightarrow T}(\phi_{T \rightarrow R}(p)))=T_{ab}(p)$, which is more helpful for subsequent color propagation. The cyclic consistency is also applicable to the color reference image in use of the learning network where $T_{ab}'$ is replaced by $R_{ab}'$. This indicates that chrominance information $R_{ab}'(p)$ of a pixel point p in the color reference image is reliable when there is cyclic consistency.

The grayscale source image 402, the warped chromatic image 412, and the similarity 421 are all input into the colorization learning network 220 for processing. The processing in the colorization learning network 220 may be generally expressed as follows:

$$P_{ab}^T = C(T_L, sim_{T \leftrightarrow R}, T_{ab}'; \theta) \quad (4)$$

where $P_{ab}^T$ represents a colorization result of the grayscale source image 402 on the basis of the reference information provided by the warped chromatic image 412 ($T_{ab}'$), which is referred to as a chromatic image of a first predicted color image (which is denoted as 432 in FIG. 4). The chromatic image 432 and the grayscale source image 402 are composed to obtain the first predicted color image determined by the current colorization learning network 220.

On the basis of the value of the current parameter set θ, the colorization learning network 220 processes the inputs in a manner as described with reference to FIG. 2. Specifically, the colorization learning network 220 determines, based on the similarity, a first set of blocks similar to the color reference image in content and a second set of blocks dissimilar to the color reference image in content from the grayscale source image 402 (the similarity determination used here is performed on the basis of the color reference image instead of the ground-truth color image), and then determines colors for the first and second sets of blocks on the basis of the grayscale source image 401 and the warped chromatic image 412, so as to generate the first predicted color image or the chromatic image 432 of the first predicted color image.

In the cycle branch, the training basis of the colorization learning network 220 lies in the following: if the colorization learning network 220 can operate well to select correct colors for the first set of related blocks and propagate the same to the first predicted color image, it shall be also capable of recovering a ground-truth chromatic image $T_{ab}$ (denoted as 404) of the ground-truth color image from $P_{ab}^T$. The update may be performed by measuring a difference between the first predicted color image and the ground-truth color image (in particular, a difference between the chromatic images of the two images). In the training process of the cycle branch, the parameter updating objective of the colorization learning network 220 may be determined by a loss function based on the above difference.

The training architecture 400 further includes a loss function determination module 440 for determining the difference between the first predicted color image and the ground-truth color image, and determining the loss function in the cycle branch based on the difference. In some implementations, the difference between the first predicted color image and the ground-truth color image may be determined as a different between corresponding pixels of the first predicted color image and the ground-truth color image, and may be measured through various distance computation methods. In some implementations, the loss function determination module 440 may measure differences between corresponding pixels of the chromatic images 432 and 404 of the first predicted color image and the ground-truth color image. In these implementations, the loss function determination module 440 may determine the following loss function:

$$\mathcal{L}_{cycle}(P_{ab}^T) = \Sigma_p smooth\_L_1(P_{ab}^T(p), T_{ab}(p)) \quad (5)$$

where $smooth\_L_1(x,y)$ is used to measure a distance between two pixels. Specifically, if $|x-Y|<1$, $smooth\_L_1(x,y)=\frac{1}{2}(x-y)^2$; otherwise, $smooth\_L_1(x,y)=|x-y|-\frac{1}{2}$. The smooth_L1 distance is used to measure the difference between the pixels so as to avoid the averaging solution in the ambiguous colorization problem. However, it would be appreciated that various other distance or similarity measure techniques may be used in other cases to determine the difference between the corresponding pixels. In Equation (5), the loss function $\mathcal{L}_{cycle}(P_{ab}^T)$ is determined as a sum of all differences of corresponding pixels of the chromatic images 432 and 404. Of course, the difference between two images may be measured on the basis of the first predicted color image and the ground-truth color image that include information in all the channels, and the above determination based on the a and b channels only is not necessary but is more convenient and efficient in computation.

The training architecture 400 further includes a model updating module 450 for updating the colorizing learning network 220 based on the loss function $\mathcal{L}_{cycle}(P_{ab}{}^T)$. The model updating module 450 may update the colorization learning network 220 by minimizing the loss function, i.e., update the values of the parameter set θ of the colorization learning network 220. With the loss function minimized, the updated colorization learning network 220 may reduce or even minimize the color differences between the first set of blocks in the first predicted color image and the corresponding blocks in the ground-truth color image. As such, the colorization learning network 220 learns to propagate reliable colors in the color reference image to the grayscale image from the training process.

If the colorization learning network 220 is trained only in the cycle branch, it is likely that the learning network 220 can output a better colorization result only when the color reference image and grayscale source image are very similar in content (semantically). Therefore, the perceptual branch is further required to continue training the colorization learning network 220.

In the training process of the perceptual branch (as indicated by a dashed arrow in FIG. 4), as mentioned above, the training data includes the grayscale source image $T_L$ (denoted as 402), a color reference image $R_{Lab}$ used as reference information and the similarity $sim_{T \leftrightarrow R}$ (denoted as 421) between the grayscale source image $T_L$ and the color reference image $R_{Lab}$. Likewise, the chromatic image of the color reference image $R_{Lab}$ may be warped based on the bidirectional mapping $\phi_{T \rightarrow R}$ and $\phi_{R \rightarrow T}$ between the grayscale source image $T_L$ and the color reference image $R_{Lab}$, to obtain the warped chromatic image $R_{ab}'$ (which is denoted as 414 in FIG. 4).

The grayscale source image 402, the warped chromatic image 414, and the similarity 421 are all input to the colorization learning network 220 for processing. The processing in the colorization learning network 220 may be generally expressed as follows:

$$P_{ab}=C(T_L,sim_{T \leftrightarrow R},R_{ab}';\theta) \quad (6)$$

where $P_{ab}$ represents a colorization result of the grayscale source image 402 on the basis of the reference information provided by the warped chromatic image 414, which is also referred to as a chromatic image of a second predicted color image (which is denoted as 434 in FIG. 4). The chromatic image 434 and the grayscale source image 402 are composed to obtain the second predicted color image determined by the current colorization learning network 220.

On the basis of the value of the current parameter set θ, the colorization learning network 220 processes the inputs in the manner as described with reference to FIG. 2. Specifically, the colorization learning network 220 determines, based on the similarity, a first set of blocks similar to the color reference image in content and a second set of blocks dissimilar to the color reference image in content from the grayscale source image 402 (the similarity determination used here is performed on the basis of the color reference image, instead of the ground-truth color image), and then determines colors for the first and second sets of blocks on the basis of the grayscale source image 402 and the warped chromatic image 414, so as to generate the second predicted color image or the chromatic image 432 of the second predicted color image.

In the perceptual branch, the training basis of the colorization learning network 220 lies in the following: if the colorization learning network 220 can operate well, it shall be capable of learning reasonable, natural colors from the color reference image to apply on the second set of blocks. In some implementations, in the training process of the perceptual branch, the parameter updating objective of the colorization learning network 220 is to measure a difference between the second predicted color image and the ground-truth color image (in particular, a difference between chromatic images of the two images) in the feature space. In some implementations, the training architecture 400 further includes a feature extraction module 460 for extracting a first feature map of the second predicted color image (specifically, of the chromatic image 434) and a second feature map of the ground-truth color image (specifically, of the ground-truth chromatic image 404).

The feature extraction module 460 may be implemented based on a learning network and thus may also be referred to as feature extraction learning network 460. The feature extraction learning network 460 may employ a similar structure of the feature extraction learning network 310 in the similarity determination module 210, for example, may be designed as CNN. However, different from the feature extraction learning network 310, the feature extraction learning network 460 may be trained on the basis of the color images or the chromatic images of the color images, so as to extract feature maps of the chromatic images 434 and 404 more accurately. The first feature map and the second feature map may be feature maps extracted from any one or the last one of a plurality of convolutional layers in the feature extraction module 460.

The training architecture 400 further includes a loss function determination module 470 for determining a difference between the first feature map and the second feature map (which may be determined by differences between corresponding pixels in the two feature maps, for example), and may determine a loss function in the perceptual branch based on this difference. In these implementations, the loss function determination module 470 may determine the following loss function:

$$\mathcal{L}_{perc}(P_{ab})=\Sigma_p\|F_P(p)-F_T(p)\|_2 \quad (7)$$

where $F_P$ represents the first feature map of the second predicted color image, and $F_T$ represents the second feature map of the ground-truth color image.

The loss function $\mathcal{L}_{perc}(P_{ab})$ is provided to the model updating module 450 for updating the colonization learning network 220 based on the loss function $\mathcal{L}_{perc}(P_{ab})$, i.e., update the values of the parameter set θ. The loss functions of the cycle branch and the perceptual branch may be combined as a total loss function of the colorization learning network 220. The updating process of the parameter set θ of the colorization learning network 220 may be expressed as follows:

$$\theta^* = \underset{\theta}{\operatorname{argmin}}(\mathcal{L}_{cycle}(P_{ab}^T) + \alpha\mathcal{L}_{perc}(P_{ab})) \quad (8)$$

where the parameter α may be a weight for balancing the loss functions of the two branches and may be set to any value approximate to 0, such as 0.005, 0.003, 0.01 and the like.

As mentioned above, the training of the cycle branch and the perceptual branch may be performed separately. By performing the above training processes iteratively, the colorization learning network 220 is continuously updated using more training data, such that the learning network can learn the capability of colorizing a grayscale source image based on a color reference image. In some implementations, for each grayscale source image, a different color reference image is selected for training in the training process, such that the colorization learning network 220 may be more robust to the reference information. In some implementations, a role of a color image may be switched in the training process, i.e., the image may serve as a color reference image for other images, or a grayscale image of the color image may be extracted as a network input and this color image may serve as the ground-truth color image of the grayscale image.

Through such end-to-end training, the colorization learning network 220 may learn how to select reference colors on the basis of the grayscale source image, the color reference image and the similarity therebetween, how to propagate the colors onto the grayscale image and how to predict reasonable colors for blocks where no reference colors are obtained. These steps are not executed sequentially but can be implemented by the colorization learning network 220 simultaneously based on the learning result. The multi-task training of the cycle branch and the perceptual branch can facilitate achievement of this objective, i.e., selection of colors from the color reference image for blocks having high similarities while learning of reasonable, natural colors from a large amount of training data for blocks having low similarities. The colorization learning network 220 obtained from the end-to-end training does not depend solely on the color reference image or a single color specific to an object learned from the training data. Consequently, the colorization result is controllable by the user (for example, by means of providing a color reference image). In the meantime, the colorization result is also robust to the color reference image. For example, a reasonable colorization image can be provided, even though a color reference image completely unrelated to the grayscale source image is used. Such colorization learning network thus has a high transferability. For example, the colorization learning network can operate on other unnatural images to provide satisfactory results even though the network is trained purely on natural images (the natural images are easily accessible in an image database).

Selection of Color Reference Image

In the implementations of the subject matter described herein, colorization of a grayscale source image depends on a color reference image. When performing the colorization, in addition to the grayscale source image, the color reference images may also be provided by the user so as to provide a satisfactory result for the user. In some implementations, in order to help the user find a better color reference image, a color reference image(s) may be automatically recommended to the user based on the grayscale source image, and the image colorization process as described with reference to FIG. 2 may be executed after the user selects a recommended color reference image. Alternatively, the colorization of the grayscale source image may be automatically started after the color reference image is retrieved. In other words, after the user provides a grayscale source image to be colorized, the colorization may be executed fully automatically, without requiring extra user interaction or user-guided information. In the following, it will be described in detail how a color reference image is selected for a certain grayscale source image to facilitate the colorization of the grayscale source image.

Figure 5:
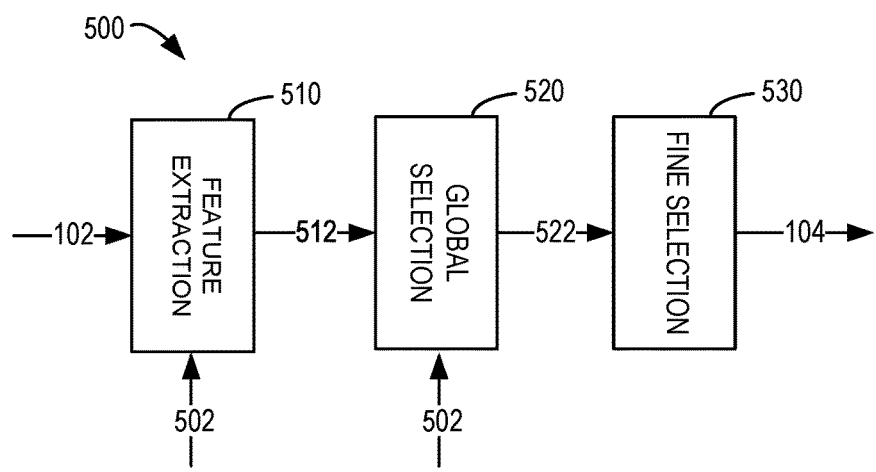
FIG. 5 illustrates a block diagram of a system for selecting a color reference image in accordance with an implementation of the subject matter described herein.

FIG. 5 illustrates a block diagram of a system 500 for selecting a color reference image in accordance with an implementation of the subject matter described herein. The system 500 is provided for search at different fineness levels from a plurality of color candidate images 502 to determine the color reference image 104 for the grayscale source image 102 on which the image colorization is to be executed. In some image database, color images may probably have been labeled to different classes, and color images within the same class may be obtained therefrom as the color candidate images 502, which may reduce the subsequent computation complexity.

The ideal color reference image is a color image that matches the grayscale source in both semantic content and photometric luminance. The purpose of incorporating luminance information is to avoid unnatural composition of luminance and chrominance in the images. The composition of luminance and chrominance may produce visually unfaithful colors when reference colors (for example, information corresponding to the chrominance channel) in the color reference image are composed into the grayscale source image. As a result, it is desired that luminance of the color reference image is as close as possible to that of the grayscale source image.

In order to measure a semantic similarity, comparison may be performed in a feature space. The system 500 includes a feature extraction module 510 for extracting a first feature map of the grayscale source image 102. The feature extraction module 510 may also perform feature extraction on the plurality of color candidate images 502. In order to prevent impacts of the chrominance information, a plurality of grayscale candidate images may be determined from the plurality of color candidate images 502, respectively. The plurality of grayscale candidate images include only luminance information of the respective color candidate images 502. The feature extraction module 510 extracts a plurality of second feature maps of the grayscale candidate images. The feature extraction module 510 may be implemented based on a learning network and thus may also be referred to as a feature extraction learning network 510. In some examples, the feature extraction module 510 may be implemented using the feature extraction learning network 310 for feature extraction of a grayscale image as shown in FIG. 3, which is designed, for example, as a CNN. In some implementations, the feature extraction module 310 may use a feature map extracted from any one or the last one of the plurality of convolutional layers as a feature map for subsequent use.

The system 500 further includes a global selection module 520. The global selection module 520 selects, from the plurality of color candidate images 502, some color candidate images (which may be referred to as intermediate color candidate images) 522 that are semantically similar to the grayscale source image 102 on the basis of the feature maps 512. Selection of the intermediate color candidate images may be determined by differences between the first feature map of the grayscale source image 102 and feature maps of the plurality of color candidate images 502. This is similar to the similarity determination module 210 in the image colorization module 122. A difference between a pair of feature maps may be determined by differences between corresponding pixels in the two feature maps, and a difference between two pixels may, for example, be determined as a cosine similarity between the pixel values (for example, the distance computation as in Equation (4)). In this manner, a total similarity between the first feature map of the grayscale source image 102 and each color candidate image 502 may be determined. The total similarities are ranked and a plurality (or a predetermined number) of intermediate color candidate images 522 ranked at the top are selected therefrom based on the ranking result.

The global selection module 520 considers only the similarity between the individual feature maps, which might not be able to provide more accurate information comparison between the images because the individual feature map may neglect some aspects of information such as the spatial information or the like. However, by means of the global selection module 520, some color candidate images having low semantic similarities may be first filtered out. The system 500 further includes a fine selection module 530 for further considering whether the grayscale source image 102 and the intermediate color reference images 522 are semantically similar and matched in luminance. The fine selection module 530 selects a color reference image based on both the semantic similarity and the luminance information of the grayscale source image 102 and the intermediate color candidate images 522. When the semantic similarity is considered, a similarity between the first feature map and the corresponding second feature map is determined for an image pair including the grayscale source image 102 and each intermediate color candidate image 522. In addition, a luminance distribution of the image pair including the grayscale source image 102 and each intermediate color candidate image 522 is measured. The fine selection module 530 determines a first luminance distribution of the grayscale source image 102 and a plurality of luminance distributions of the plurality of intermediate color candidate images 522, and takes into account correlations between the first luminance distribution and the plurality of second luminance distributions when selecting the color reference image 104.

In some implementations, the fine selection module 530 may determine a fine similarity for the image pair including the grayscale source image 102 and each intermediate color candidate image 522. The fine similarity may be determined based on the semantic similarity and the correlation of their luminance distributions. In some implementations, for each image pair (represented as $\{T_L, R_i\}$) including the grayscale source image 102 and each intermediate color candidate image 522, for a given pixel location p in the first feature map (represented as $F_T$), the nearest neighbor pixel location q in the second feature map of the intermediate color candidate image 522 may be determined as q=NN(p). The pixel q may be determined by minimizing a difference (for example, a cosine similarity) between pixel values of the two locations in the first and second feature maps. Therefore, the semantic similarity between the grayscale source image 102 and each intermediate color candidate image 522 may be determined as a difference between corresponding pixels (i.e., a difference or cosine similarity between the pixels p and q).

In some implementations, when determining a correlation of the luminance distributions, a similarity between luminance distributions of regions including the corresponding pixels in the grayscale source image 102 and each intermediate color candidate image 522 may be measured. The corresponding pixel locations in the images may be inferred from the corresponding pixel locations in the feature maps because the dimensions of the feature maps are obtained by image downsampling. Specifically, the images 102 and 522 may be divided into a plurality of regions, each of which includes a plurality of pixels. It is supposed that $C_T(p)$ represents a block including the pixel p in the grayscale source image 102 while $C_{R_i}(q)$ represents a block of the intermediate color candidate image i including the corresponding pixel q. Statistics for luminance histograms in the two blocks are used as the luminance distributions of the images.

When both the semantic similarity and the luminance similarity are considered, the fine selection module 530 may determine a fine similarity between the grayscale source image 102 and an intermediate color candidate image 522 may be determined as follows:

$$\text{score}(T, R_i) = \sum_p (d(F_T^5(p), F_{R_i}^5(q)) + \beta d_H(C_T(p), C_{R_i}(q))) \quad (9)$$

where $d(F_T^5(p), F_{R_i}^5(q))$ (indicates a similarity between the feature maps of the grayscale source image 102 and the intermediate color candidate image 522 in which the superscript 5 indicates that the feature map is extracted from the fifth convolutional layer of the learning network 510 even though the feature map from any other layer may be used. $d_H(C_T(p), C_{R_i}(q))$ represents a correlation between the luminance distributions of the grayscale source image 102 and the intermediate color candidate image 522. The parameter $\beta$ is provided for balancing influences of the semantic similarity and the luminance distribution correlation on the overall fine similarity. The parameter $\beta$ may be set to any value between 0 and 1. According to Equation (9), the fine similarity between the grayscale source image 102 and an intermediate color candidate image 522 may be determined by summing up the semantic similarities determined for a plurality of pixel locations p in the feature map and the corresponding luminance distribution correlations.

After determining the fine similarities between the grayscale source image 102 and all the intermediate color candidate images 522, the fine selection module 530 may rank the similarities and select an intermediate color candidate image 522 ranked at the top or the topmost as the color reference image 104. In some implementations, the fine selection module 530 may also provide the user with two or more intermediate color candidate images 522 ranked at the top and determine the color reference image 104 for subsequent image colorization based on the user selection.

It would be appreciated that a specific example of selecting a color reference image from a plurality of color candidate images has been described above. In other implementations, other techniques related to image classification or image identification may be used to determine a color reference image similar to the grayscale source image 102 semantically and/or in luminance. In some implementations, the system 500 may omit the fine selection module 530, and be only directed to the selection of the color reference image 104 in the feature space. The implementations of the subject matter described herein are not limited in this regard.

Example Processes

Figure 6:
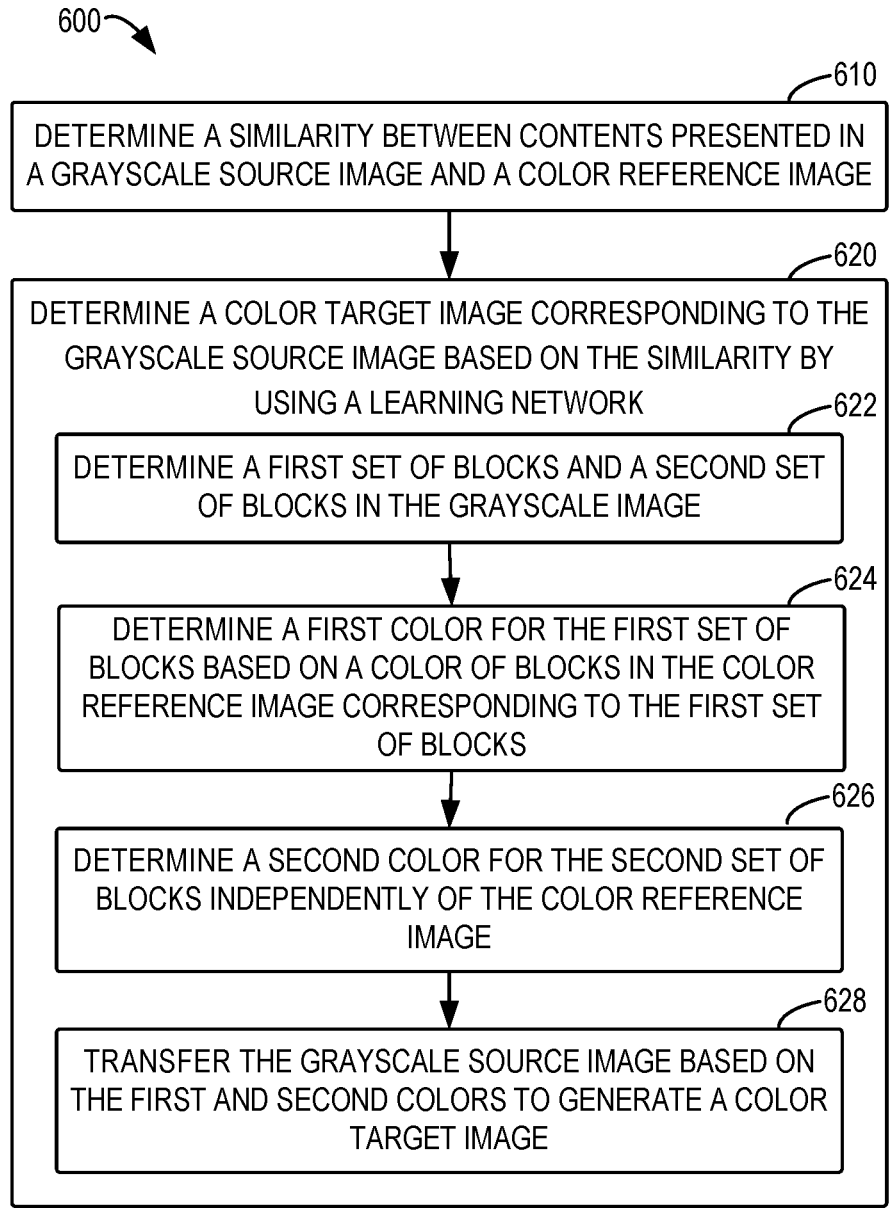
FIG. 6 illustrates a flowchart of a process for image colorization in accordance with an implementation of the present application.

FIG. 6 illustrates a flowchart of a process 600 for image colorization in accordance with some implementations of the subject matter described herein. The process 600 may be implemented by the computing device 100, for example at the image colorization module 122 in the memory 120 of the computing device 100. At block 610, a similarity between contents presented in a grayscale source image and a color reference image is determined. At block 620, a color target image corresponding to the grayscale source image is determined based on the similarity by using a learning network. Specifically, at sub-block 622, a first set of blocks similar to the color reference image in content and a second set of blocks dissimilar to the color reference image in content are determined based on the similarity from the grayscale image. At sub-block 624, a first color for the first set of blocks is determined based on a color of blocks in the color reference image corresponding to the first set of blocks. At sub-block 626, a second color for the second set of blocks is determined independently of the color reference image. At sub-block 628, the grayscale source image is transferred based on the first and second colors to generate a color target image.

In some implementations, determining the similarity between the contents comprises: determining a grayscale reference image corresponding to the color reference image; extracting a first feature map of the grayscale source image and a second feature map of the grayscale reference image; and determining the content similarity based on a difference between the first feature map and the second feature map.

In some implementations, extracting the first feature map and the second feature map comprises: extracting at least a high-level feature map of the grayscale source image as the first feature map; and extracting at least a high-level feature map of the grayscale reference image as the second feature map.

In some implementations, the process 600 further comprises obtaining the color reference image by obtaining a plurality of color candidate images; determining a plurality of grayscale candidate images that corresponds to the plurality of color candidate images, respectively; extracting a first feature map of the grayscale source image and a plurality of second feature maps of the plurality of grayscale candidate images; and selecting the color reference image from the plurality of color candidate images based on differences between the first feature map and the plurality of second feature maps.

In some implementations, selecting the color reference image comprises: determining a plurality of intermediate color candidate images from the plurality of color candidate images based on the differences between the first feature map and the plurality of second feature maps; determining a first luminance distribution of the grayscale source image and a plurality of second luminance distributions of the plurality of intermediate color candidate images; and selecting the color reference image from the plurality of intermediate color candidate images at least based on correlations between the first luminance distribution and the plurality of second luminance distributions.

In some implementations, selecting the color reference image from the plurality of intermediate color candidate images comprises: selecting the color reference image further based on differences between the first feature map and a plurality of second feature maps corresponding to the plurality of intermediate color candidate images.

In some implementations, determining the similarity comprises: determining a first directional similarity from the grayscale source image to the color reference image and a second directional similarity from the color reference image to the grayscale source image.

In some implementations, determining the similarity between the contents presented in the grayscale source image and the color reference image comprises: indicating the color reference image to the user; and in response to a selection of the color reference image by the user, determining the similarity between the contents presented in the grayscale source image and the color reference image.

In some implementations, the process 600 further comprises receiving the color reference image provided by a user.

In some implementations, the second color comprises a color learned by the learning network from blocks similar to the second set of blocks in content.

Figure 7:
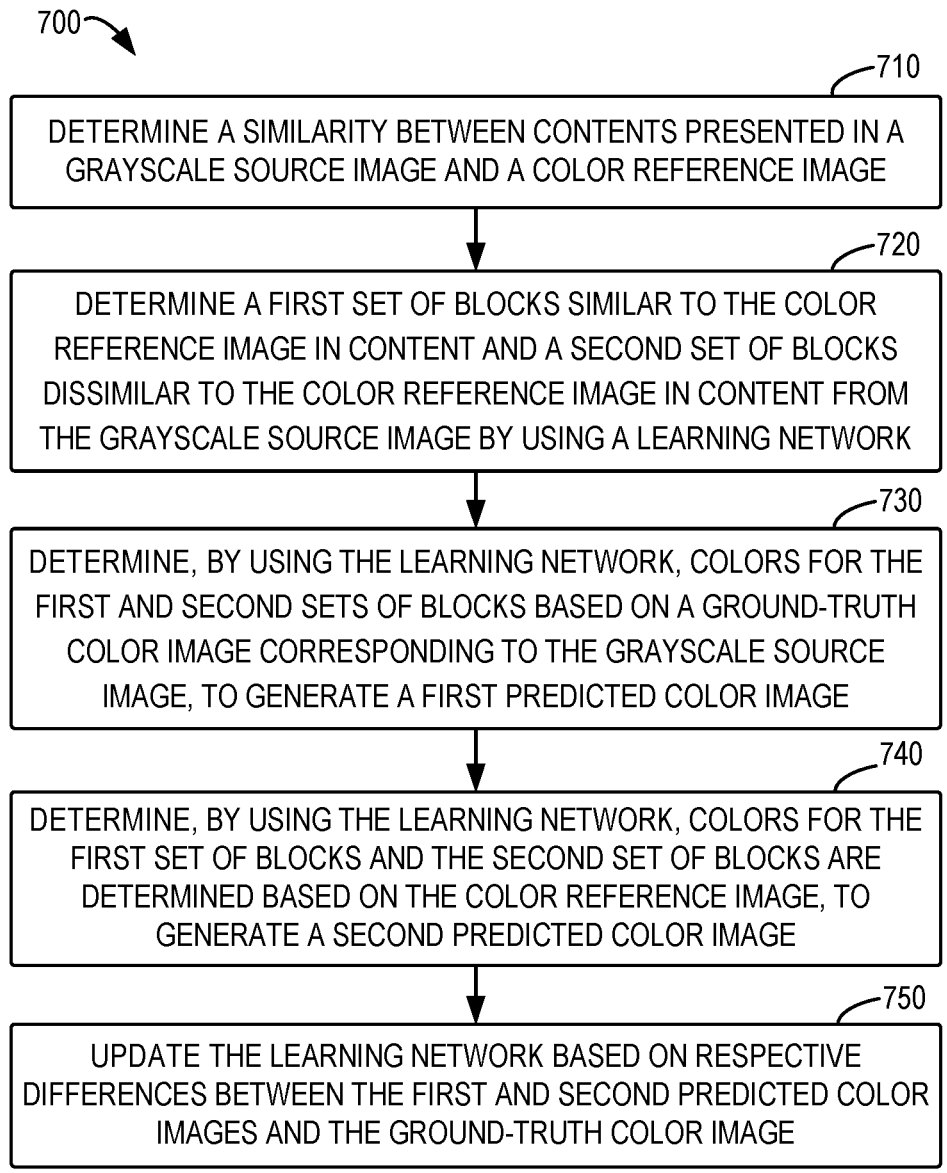
FIG. 7 illustrates a flowchart of a process for training a learning network for image colorization in accordance with an implementation of the subject matter described herein.

FIG. 7 illustrates a flowchart of a process 700 of training a learning network for image colorization in accordance with some implementations of the subject matter described herein. The process 700 may be implemented by the computing device 100 or another device. At block 710, a similarity between contents presented in a grayscale source image and a color reference image is determined. At block 720, a first set of blocks similar to the color reference image in content and a second set of blocks dissimilar to the color reference image in content are determined from the grayscale source image by using a learning network. At block 730, colors for the first and second sets of blocks are determined, by using the learning network, based on a ground-truth color image corresponding to the grayscale source image, to generate a first predicted color image. At bock 740, colors for the first set of blocks and the second set of blocks are determined, by using the learning network, based on the color reference image, to generate a second predicted color image. At block 750, the learning network is updated based on respective differences between the first and second predicted color images and the ground-truth color image.

In some implementations, updating the learning network comprises: updating the learning network based on a first difference between the first predicted color image and the ground-truth color image; and re-updating the learning network based on a second difference between the second predicted color image and the ground-truth color image.

In some implementations, the process 700 further comprises determining the second difference by extracting a first feature map of the second predicted color image and a second feature map of the ground-truth color image; and determining a difference between the first and second feature maps as the second difference.

In some implementations, extracting the first feature map and the second feature map comprises: extracting at least a high-level feature map of the second predicted color image as the first feature map; and extracting at least a high-level feature map of the ground-truth color image as the second feature map.

In some implementations, determining the similarity further comprises: determining the similarity using a further learning network; and updating the learning network comprises jointly updating the learning network and the further learning network.

Example Implementations

Some example implementations of the subject matter described herein are given below.

In a first aspect, the subject matter described herein provides a computer-implemented method. The method comprises: determining a similarity between contents presented in a grayscale source image and a color reference image; and determining a color target image corresponding to the grayscale source image based on the similarity by using a learning network, comprising: determining, based on the similarity and from the grayscale image, a first set of blocks similar to the color reference image in content and a second set of blocks dissimilar to the color reference image in content, determining a first color for the first set of blocks based on a color of blocks in the color reference image corresponding to the first set of blocks, determining a second color for the second set of blocks independently of the color reference image, and transferring the grayscale source image based on the first and second colors to generate a color target image.

In some implementations, determining the similarity between the contents comprises: determining a grayscale reference image corresponding to the color reference image; extracting a first feature map of the grayscale source image and a second feature map of the grayscale reference image;

and determining the content similarity based on a difference between the first feature map and the second feature map.

In some implementations, extracting the first feature map and the second feature map comprises: extracting at least a high-level feature map of the grayscale source image as the first feature map; and extracting at least a high-level feature map of the grayscale reference image as the second feature map.

In some implementations, the method further comprises obtaining the color reference image by obtaining a plurality of color candidate images; determining a plurality of grayscale candidate images that corresponds to the plurality of color candidate images, respectively; extracting a first feature map of the grayscale source image and a plurality of second feature maps of the plurality of grayscale candidate images; and selecting the color reference image from the plurality of color candidate images based on differences between the first feature map and the plurality of second feature maps.

In some implementations, selecting the color reference image comprises: determining a plurality of intermediate color candidate images from the plurality of color candidate images based on the differences between the first feature map and the plurality of second feature maps; determining a first luminance distribution of the grayscale source image and a plurality of second luminance distributions of the plurality of intermediate color candidate images; and selecting the color reference image from the plurality of intermediate color candidate images at least based on correlations between the first luminance distribution and the plurality of second luminance distributions.

In some implementations, selecting the color reference image from the plurality of intermediate color candidate images comprises: selecting the color reference image further based on differences between the first feature map and a plurality of second feature maps corresponding to the plurality of intermediate color candidate images.

In some implementations, determining the similarity comprises: determining a first directional similarity from the grayscale source image to the color reference image and a second directional similarity from the color reference image to the grayscale source image.

In some implementations, determining the similarity between the contents presented in the grayscale source image and the color reference image comprises: indicating the color reference image to the user; and in response to a selection of the color reference image by the user, determining the similarity between the contents presented in the grayscale source image and the color reference image.

In some implementations, the method further comprises receiving the color reference image provided by a user.

In some implementations, the second color comprises a color learned by the learning network from blocks similar to the second set of blocks in content.

In a second aspect, the subject matter described herein provides a computer-implemented method. The method comprises: determining a similarity between contents presented in a grayscale source image and a color reference image; determining, by using a learning network, a first set of blocks similar to the color reference image in content and a second set of blocks dissimilar to the color reference image in content from the grayscale source image; determining, by using the learning network, colors for the first set of blocks and the second set of blocks based on a ground-truth color image corresponding to the grayscale source image, to generate a first predicted color image; determining, by using the learning network, colors for the first set of blocks and the second set of blocks based on the color reference image, to generate a second predicted color image; and updating the learning network based on respective differences between the first and second predicted color images and the ground-truth color image.

In some implementations, updating the learning network comprises: updating the learning network based on a first difference between the first predicted color image and the ground-truth color image; and re-updating the learning network based on a second difference between the second predicted color image and the ground-truth color image.

In some implementations, the process 700 further comprises determining the second difference by extracting a first feature map of the second predicted color image and a second feature map of the ground-truth color image; and determining a difference between the first and second feature maps as the second difference.

In some implementations, extracting the first feature map and the second feature map comprises: extracting at least a high-level feature map of the second predicted color image as the first feature map; and extracting at least a high-level feature map of the ground-truth color image as the second feature map.

In some implementations, determining the similarity further comprises: determining the similarity using a further learning network; and updating the learning network comprises jointly updating the learning network and the further learning network.

In a third aspect, the subject matter described herein provides an electronic device. The electronic device comprises a processing unit; and a memory coupled to the processing unit and comprising instructions stored thereon, the instructions, when executed by the processing unit, causing the device to perform acts of: determining a similarity between contents presented in a grayscale source image and a color reference image; and determining a color target image corresponding to the grayscale source image based on the similarity by using a learning network, comprising: determining, based on the similarity and from the grayscale image, a first set of blocks similar to the color reference image in content and a second set of blocks dissimilar to the color reference image in content, determining a first color for the first set of blocks based on a color of blocks in the color reference image corresponding to the first set of blocks, determining a second color for the second set of blocks independently of the color reference image, and transferring the grayscale source image based on the first and second colors to generate a color target image.

In some implementations, determining the similarity between the contents comprises: determining a grayscale reference image corresponding to the color reference image; extracting a first feature map of the grayscale source image and a second feature map of the grayscale reference image; and determining the content similarity based on a difference between the first feature map and the second feature map.

In some implementations, extracting the first feature map and the second feature map comprises: extracting at least a high-level feature map of the grayscale source image as the first feature map; and extracting at least a high-level feature map of the grayscale reference image as the second feature map.

In some implementations, the acts further comprise obtaining the color reference image by obtaining a plurality of color candidate images; determining a plurality of grayscale candidate images that corresponds to the plurality of color candidate images, respectively; extracting a first feature map of the grayscale source image and a plurality of second feature maps of the plurality of grayscale candidate images; and selecting the color reference image from the plurality of color candidate images based on differences between the first feature map and the plurality of second feature maps.

In some implementations, selecting the color reference image comprises: determining a plurality of intermediate color candidate images from the plurality of color candidate images based on the differences between the first feature map and the plurality of second feature maps; determining a first luminance distribution of the grayscale source image and a plurality of second luminance distributions of the plurality of intermediate color candidate images; and selecting the color reference image from the plurality of intermediate color candidate images at least based on correlations between the first luminance distribution and the plurality of second luminance distributions.

In some implementations, selecting the color reference image from the plurality of intermediate color candidate images comprises: selecting the color reference image further based on differences between the first feature map and a plurality of second feature maps corresponding to the plurality of intermediate color candidate images.

In some implementations, determining the similarity comprises: determining a first directional similarity from the grayscale source image to the color reference image and a second directional similarity from the color reference image to the grayscale source image.

In some implementations, determining the similarity between the contents presented in the grayscale source image and the color reference image comprises: indicating the color reference image to the user; and in response to a selection of the color reference image by the user, determining the similarity between the contents presented in the grayscale source image and the color reference image.

In some implementations, the acts further comprise receiving the color reference image provided by a user.

In some implementations, the second color comprises a color learned by the learning network from blocks similar to the second set of blocks in content.

In a fourth aspect, the subject matter described herein provides an electronic device. The electronic device comprises: a processing unit; and a memory coupled to the processing unit and comprising instructions stored thereon, the instructions, when executed by the processing unit, causing the device to perform acts of: determining a similarity between contents presented in a grayscale source image and a color reference image; determining, by using a learning network, a first set of blocks similar to the color reference image in content and a second set of blocks dissimilar to the color reference image in content from the grayscale source image; determining, by using the learning network, colors for the first set of blocks and the second set of blocks based on a ground-truth color image corresponding to the grayscale source image, to generate a first predicted color image; determining, by using the learning network, colors for the first set of blocks and the second set of blocks based on the color reference image, to generate a second predicted color image; and updating the learning network based on respective differences between the first and second predicted color images and the ground-truth color image.

In some implementations, updating the learning network comprises: updating the learning network based on a first difference between the first predicted color image and the ground-truth color image; and re-updating the learning network based on a second difference between the second predicted color image and the ground-truth color image.

In some implementations, the process 700 further comprises determining the second difference by extracting a first feature map of the second predicted color image and a second feature map of the ground-truth color image; and determining a difference between the first and second feature maps as the second difference.

In some implementations, extracting the first feature map and the second feature map comprises: extracting at least a high-level feature map of the second predicted color image as the first feature map; and extracting at least a high-level feature map of the ground-truth color image as the second feature map.

In some implementations, determining the similarity further comprises: determining the similarity using a further learning network; and updating the learning network comprises jointly updating the learning network and the further learning network.

In a fifth aspect, the subject matter described herein provides a computer program product which is tangibly stored in a non-transient computer storage medium and comprising machine executable instructions which, when executed by a device, cause the device to perform the method in the first or second aspect.

In a sixth aspect, the subject matter described herein provides a computer readable medium having machine executable instructions stored thereon which, when executed by a device, cause the device to perform the method in the first or second aspect.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
   determining a similarity between contents presented in a grayscale source image and a color reference image; and
   determining a color target image corresponding to the grayscale source image based on the similarity by using a learning network, comprising:
      determining, based on the similarity and from the grayscale image, a first set of blocks similar to the color reference image in content and a second set of blocks dissimilar to the color reference image in content,
      determining a first color for the first set of blocks based on a color of blocks in the color reference image corresponding to the first set of blocks,
      determining a second color for the second set of blocks independently of the color reference image, and
      transferring the grayscale source image based on the first and second colors to generate a color target image.

2. The method of claim 1, wherein determining the similarity between the contents comprises:
   determining a grayscale reference image corresponding to the color reference image;
   extracting a first feature map of the grayscale source image and a second feature map of the grayscale reference image; and
   determining the content similarity based on a difference between the first feature map and the second feature map.

3. The method of claim 2, wherein extracting the first feature map and the second feature map comprises:
   extracting at least a high-level feature map of the grayscale source image as the first feature map; and
   extracting at least a high-level feature map of the grayscale reference image as the second feature map.

4. The method of claim 1, further comprising obtaining the color reference image by:
   obtaining a plurality of color candidate images;
   determining a plurality of grayscale candidate images that corresponds to the plurality of color candidate images, respectively;
   extracting a first feature map of the grayscale source image and a plurality of second feature maps of the plurality of grayscale candidate images; and
   selecting the color reference image from the plurality of color candidate images based on differences between the first feature map and the plurality of second feature maps.

5. The method of claim 4, wherein selecting the color reference image comprises:
   determining a plurality of intermediate color candidate images from the plurality of color candidate images based on the differences between the first feature map and the plurality of second feature maps;
   determining a first luminance distribution of the grayscale source image and a plurality of second luminance distributions of the plurality of intermediate color candidate images; and
   selecting the color reference image from the plurality of intermediate color candidate images at least based on correlations between the first luminance distribution and the plurality of second luminance distributions.

6. The method of claim 5, wherein selecting the color reference image from the plurality of intermediate color candidate images comprises:
   selecting the color reference image further based on differences between the first feature map and a plurality of second feature maps corresponding to the plurality of intermediate color candidate images.

7. The method of claim 1, wherein determining the similarity comprises:
   determining a first directional similarity from the grayscale source image to the color reference image and a second directional similarity from the color reference image to the grayscale source image.

8. The method of claim 1, wherein determining the similarity between the contents presented in the grayscale source image and the color reference image comprises:
   indicating the color reference image to the user; and
   in response to a selection of the color reference image by the user, determining the similarity between the contents presented in the grayscale source image and the color reference image.

9. The method of claim 1, wherein the second color comprises a color learned by the learning network from blocks similar to the second set of blocks in content.

10. A computer-implemented method, comprising:
    determining a similarity between contents presented in a grayscale source image and a color reference image;
    determining, by using a learning network, a first set of blocks similar to the color reference image in content and a second set of blocks dissimilar to the color reference image in content from the grayscale source image;
    determining, by using the learning network, colors for the first set of blocks and the second set of blocks based on a ground-truth color image corresponding to the grayscale source image, to generate a first predicted color image;
    determining, by using the learning network, colors for the first set of blocks and the second set of blocks based on the color reference image, to generate a second predicted color image; and updating the learning network based on respective differences between the first and second predicted color images and the ground-truth color image.

11. The method of claim 10, wherein updating the learning network comprises:
   updating the learning network based on a first difference between the first predicted color image and the ground-truth color image; and
   re-updating the learning network based on a second difference between the second predicted color image and the ground-truth color image.

12. The method of claim 11, further comprising determining the second difference by:
   extracting a first feature map of the second predicted color image and a second feature map of the ground-truth color image; and
   determining a difference between the first and second feature maps as the second difference.

13. The method of claim 10, wherein determining the similarity further comprises:
   determining the similarity using a further learning network; and
   wherein updating the learning network comprises jointly updating the learning network and the further learning network.

14. An electronic device, comprising:
   a processing unit; and
   a memory coupled to the processing unit and comprising instructions stored thereon, the instructions, when executed by the processing unit, causing the device to perform acts of:
      determining a similarity between contents presented in a grayscale source image and a color reference image; and
      determining a color target image corresponding to the grayscale source image based on the similarity by using a learning network, comprising:
         determining, based on the similarity and from the grayscale image, a first set of blocks similar to the color reference image in content and a second set of blocks dissimilar to the color reference image in content,
         determining a first color for the first set of blocks based on a color of blocks in the color reference image corresponding to the first set of blocks,
         determining a second color for the second set of blocks independently of the color reference image, and
         transferring the grayscale source image based on the first and second colors to generate a color target image.

15. The device of claim 14, wherein determining the similarity between the contents comprises:
   determining a grayscale reference image corresponding to the color reference image;
   extracting a first feature map of the grayscale source image and a second feature map of the grayscale reference image; and
   determining the content similarity based on a difference between the first feature map and the second feature map.

* * * * *